United States Patent
Mochizuki et al.

(10) Patent No.: US 11,562,513 B2
(45) Date of Patent: Jan. 24, 2023

(54) CENTER LINE SIMPLIFICATION DEVICE, NETWORK DATA GENERATION SYSTEM AND PROGRAM

(71) Applicant: NIPPON TELEGRAPH AND TELEPHONE CORPORATION, Tokyo (JP)

(72) Inventors: Mitsuru Mochizuki, Tokyo (JP); Kyota Tsutsumida, Tokyo (JP); Osamu Matsuda, Tokyo (JP); Hitoshi Seshimo, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/287,880

(22) PCT Filed: Oct. 18, 2019

(86) PCT No.: PCT/JP2019/041210
§ 371 (c)(1),
(2) Date: Apr. 22, 2021

(87) PCT Pub. No.: WO2020/085262
PCT Pub. Date: Apr. 30, 2020

(65) Prior Publication Data
US 2021/0375012 A1 Dec. 2, 2021

(30) Foreign Application Priority Data
Oct. 24, 2018 (JP) .............................. JP2018-200185

(51) Int. Cl.
*G06T 11/20* (2006.01)
*G01C 21/20* (2006.01)

(52) U.S. Cl.
CPC .......... *G06T 11/203* (2013.01); *G01C 21/206* (2013.01)

(58) Field of Classification Search
None
See application file for complete search history.

(56) References Cited

U.S. PATENT DOCUMENTS 10,204,431 B1* 2/2019 Hou ...................... G06T 11/203
2004/0263514 A1* 12/2004 Jin ....................... G06K 9/0063
345/440

(Continued)

FOREIGN PATENT DOCUMENTS

JP 2015-210626 A 11/2015
JP 2018-28867 A 2/2018

OTHER PUBLICATIONS

Filippo Mortari (2013) "Automatic Extraction of Improved Geometrical Network Model from CityGML for Indoor navigation" Research Paper, Nov. 23, 2013, 139 pages.

(Continued)

*Primary Examiner* — Jeffrey J Chow

(57) ABSTRACT

Centerlines for generating network data of an indoor space can be simplified while the amount of calculation is limited. A centerline simplification unit 240 performs processing of deleting centerlines of passages that are movable regions in an indoor space and processing of correcting centerlines. A determination unit 242 determines whether or not the simplification has ended based on the number of centerlines or the number of vertices connecting the centerlines.

17 Claims, 13 Drawing Sheets

(A) DIVIDE INTO TRIANGLES USING DELAUNAY TRIANGULATION METHOD AND PERFORM RECALCULATION IF THERE IS TRIANGLE OUTSIDE SHAPE
(B) GENERATE NODES AT CENTROIDS OF TRIANGLES
(C) THIN OUT NODES
(D) GENERATE LINKS BETWEEN NODES

-PRIOR ART-

(56) References Cited

U.S. PATENT DOCUMENTS

| | | | | |
|---|---|---|---|---|
| 2015/0276409 A1* | 10/2015 | Dhulipudi | ............... | G01C 21/00 |
| | | | | 701/3 |
| 2016/0123756 A1* | 5/2016 | Becker | ................. | H04W 4/023 |
| | | | | 701/533 |
| 2016/0252355 A1* | 9/2016 | Mays | .................. | G01C 21/206 |
| | | | | 701/533 |
| 2017/0176193 A1* | 6/2017 | Chau | .................. | G01C 21/3407 |

OTHER PUBLICATIONS

Keiko Okuaki (2012) "Method to Generate the Line data of the Road Centerline Automatically along with the Attribute Data of Width of Road" Proceedings of the Geographic Information Systems Society [online] Website: https://www.gisa-japan.org/conferences/proceedings/2012/papers/D-1-4.pdf.

* cited by examiner

-PRIOR ART-

-PRIOR ART-

CENTER LINE SIMPLIFICATION DEVICE, NETWORK DATA GENERATION SYSTEM AND PROGRAM

CROSS-REFERENCE TO RELATED APPLICATIONS

This application is a U.S. 371 Application of International Patent Application No. PCT/JP2019/041210, filed on 18 Oct. 2019, which application claims priority to and the benefit of JP Application No. 2018-200185, filed on 24 Oct. 2018, the disclosures of which are hereby incorporated herein by reference in their entireties.

TECHNICAL FIELD

The present invention relates to a centerline simplification device, a network data generation system, and a program for simplifying centerlines for generating network data of an indoor space.

BACKGROUND ART

A method using the characteristics of Delaunay triangulation (Non Patent Literature 1) and a method using the characteristics of a Voronoi diagram (Non Patent Literature 2) are known in the related art as technologies for generating centerlines which are the sources of network data.

CITATION LIST

Non Patent Literature

Non Patent Literature 1: Filippo Mortari, "Automatic Extraction of Improved Geometrical Network Model from CityGML for Indoor navigation", <retrieved from the Internet: https://3d.bk.tudelft.nl/pdfs/FilippoMortari_thesis.pdf, date accessed: 2018, Oct. 5> Non-Patent Literature 2: Keiko OKUAKI, "Method to Generate the Linedata of the Road Centerline Automatically along with the Attribute Data of Width of Road", <retrieved from the Internet: https://www-.gisa-japan.org/conferences/proceedings/2012/papers/D-1-4.pdf, date accessed: 2018, Oct. 5>

SUMMARY OF THE INVENTION

Technical Problem

Both the methods described in Non Patent Literatures 1 and 2 above have a problem that it takes time to perform processing for correcting generated centerlines because there are unnecessary parts in the generated centerlines.

The present invention has been made in view of the above circumstances and it is an object to provide a centerline simplification device, a network data generation system, and a program which can simplify centerlines for generating network data of an indoor space while limiting the amount of calculation.

Means for Solving the Problem

A centerline simplification device according to the present invention to achieve the object is a centerline simplification device for simplifying centerlines of passages that are movable regions in an indoor space, the centerline simplification device including a centerline simplification unit configured to perform processing of deleting the centerlines and processing of correcting the centerlines and a determination unit configured to determine whether or not the simplification has ended based on the number of the centerlines or the number of vertices connecting the centerlines.

A network data generation system according to the present invention includes the centerline simplification device and a network data generation device configured to generate network data which includes a link representing the passage and a node that is a starting or end point of the link based on the simplified centerlines.

A program according to the present invention is a program causing a computer to function as each unit included in the centerline simplification device.

Effects of the Invention

As described above, the centerline simplification device, the network data generation system, and the program of the present invention can achieve an advantage of enabling simplification of centerlines for generating network data of an indoor space while limiting the amount of calculation.

DESCRIPTION OF EMBODIMENTS

Hereinafter, embodiments of the present invention will be described in detail with reference to the drawings.

Overview

First, a method of generating centerlines using the characteristics of Delaunay triangulation will be described. In the method using the characteristics of Delaunay triangulation, an original shape is divided into Delaunay triangles and the centroids of the triangles are connected to generate centerlines.

Figure 15:
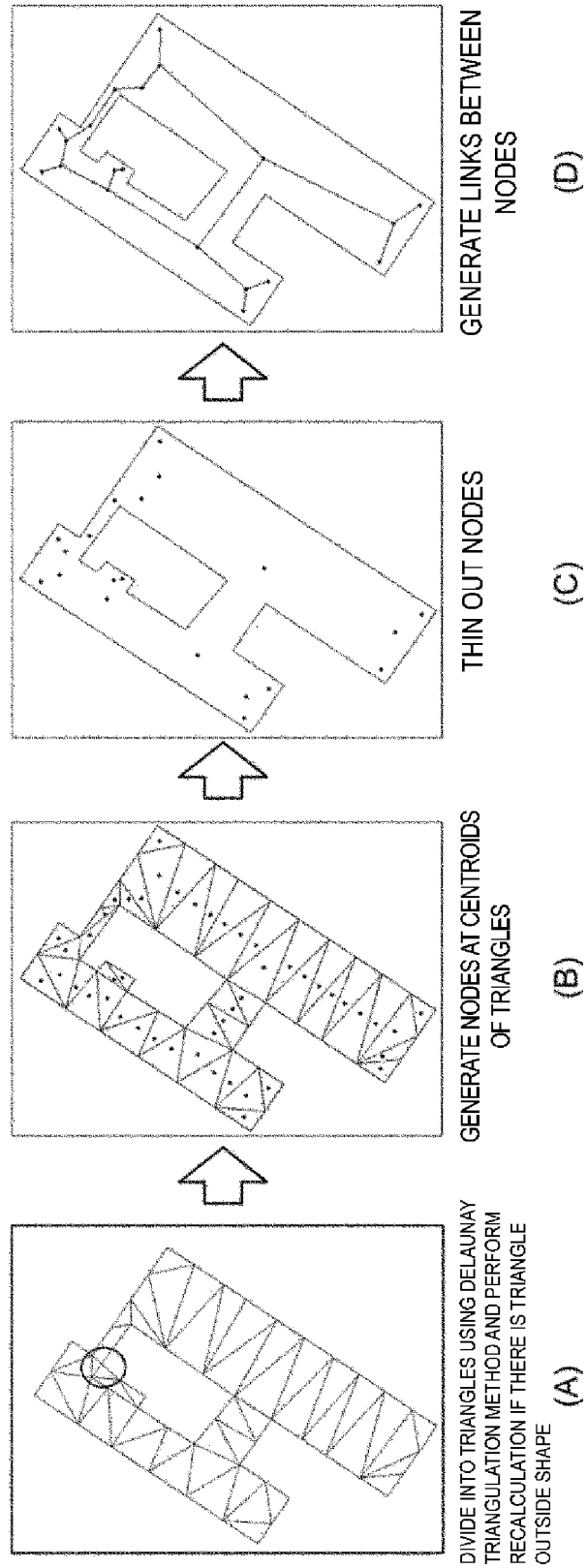
FIG. 15 is a diagram for explaining a method of generating centerlines using the characteristics of Delaunay triangulation.

Specifically, a shape is divided into triangles using the Delaunay triangulation method as illustrated in FIG. 15(A) and recalculation is performed if there is a triangle outside the shape. Then, nodes are generated at the centroids of the triangles as illustrated in FIG. 15(B).

Then, the nodes are thinned out as illustrated in FIG. 15(C). Thus, the thinning process takes more time as the number of nodes increases because it is necessary to perform processing of thinning out unnecessary nodes to obtain network data.

Figure 16:
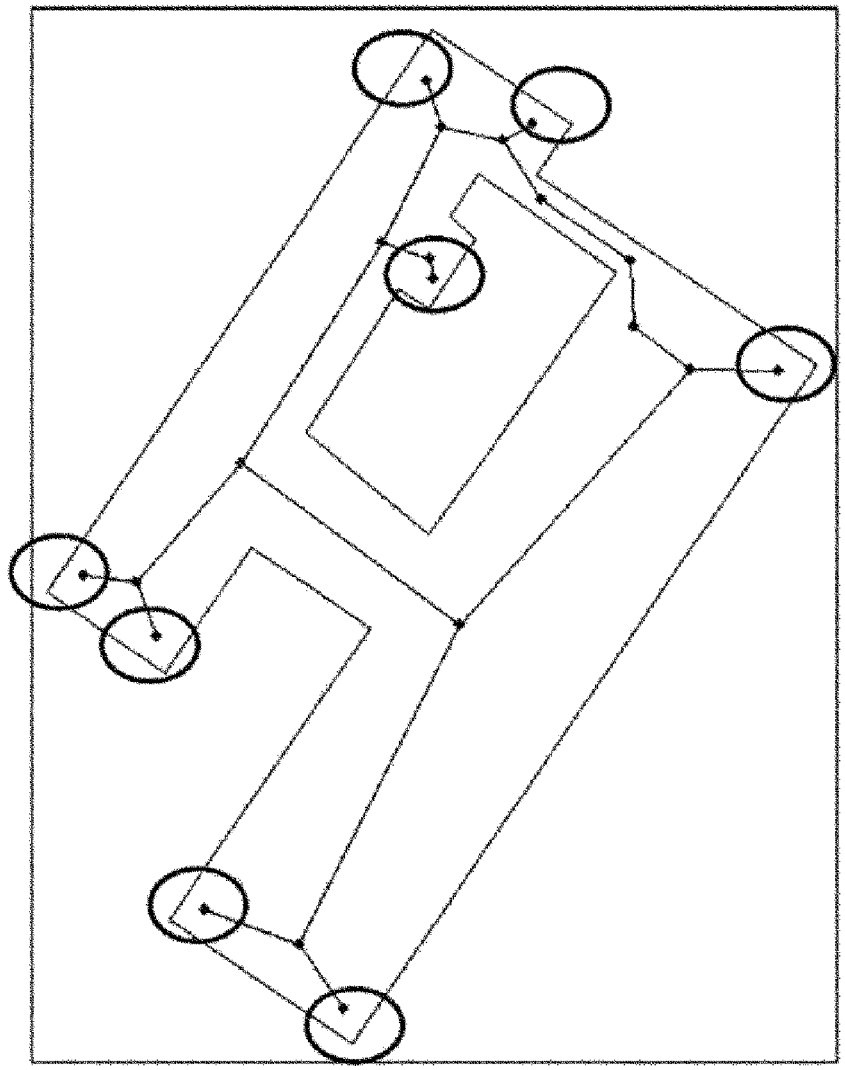
FIG. 16 is a diagram illustrating an example of a result of generating centerlines using the characteristics of Delaunay triangulation.

Then, links are generated between the nodes as illustrated in FIG. 15(D). As described above, centerlines generated using the characteristics of Delaunay triangulation generate unnecessary network data heading toward convex vertices of the original shape due to the characteristics of the generation algorithm (see FIG. 16). That is, the correction process takes more time as the number of nodes increases.

Next, a method of generating centerlines using the characteristics of the Voronoi diagram will be described. In the method using the characteristics of the Voronoi diagram, points are set at regular intervals on the sides of the original shape and Voronoi polygons are generated from the group of points. Here, adjacent polygons are combined together and sides of the combined polygons inside the original shape are set as centerlines.

Figure 17:
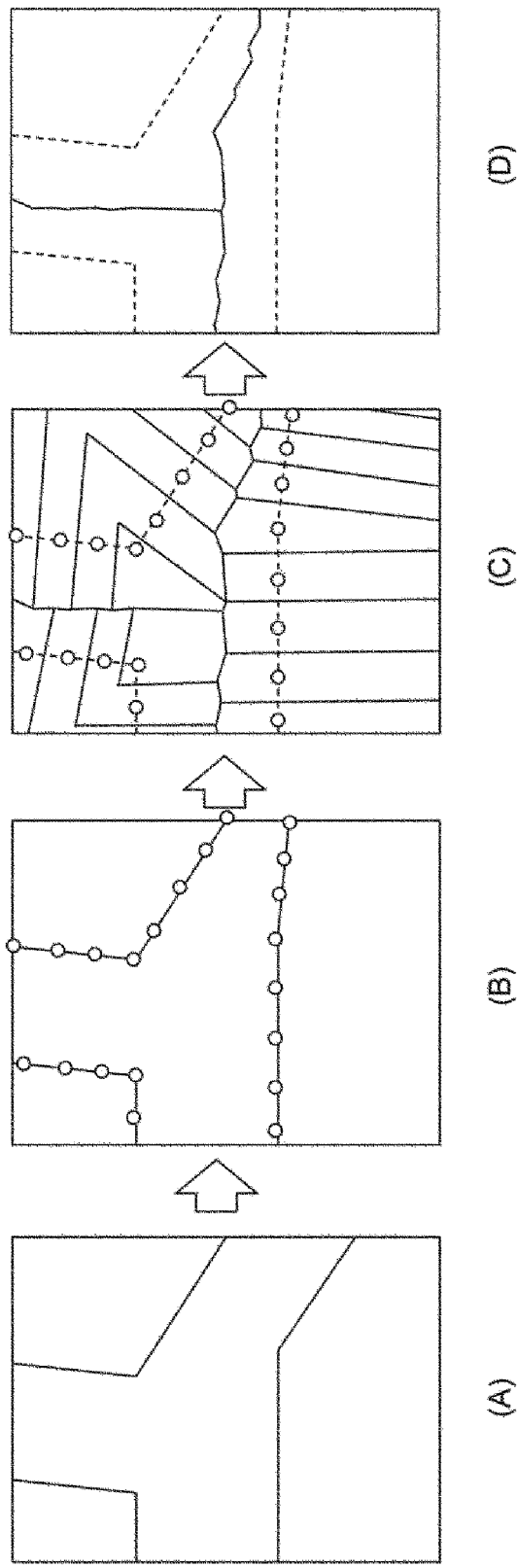
FIG. 17 is a diagram for explaining a method of generating centerlines using the characteristics of a Voronoi diagram.

Specifically, points are generated at equal intervals on the perimeter of the shape as illustrated in FIG. 17(A). Then, Voronoi polygons are generated for the generated points as illustrated in FIG. 17(B).

Then, sides of the Voronoi polygons that do not cross the perimeter of the original shape are set as centerlines as illustrated in FIG. 17(C). Further, as illustrated in FIG. 17(D), overlapping line segments are removed and vertices are thinned out to simplify the centerlines.

As described above, centerlines generated using the characteristics of the Voronoi diagram generate unnecessary network data heading toward convex vertices of the original shape due to the characteristics of the generation algorithm. That is, the correction process takes more time as the number of nodes increases.

Furthermore, centerlines generated using the characteristics of the Voronoi diagram have overlapping sides of Voronoi polygons that are in contact with each other, and thus it is necessary to remove the overlapping line segments. In addition, it is necessary to perform processing of thinning out unnecessary nodes to obtain network data. Thus, processing of correcting these takes more time as the number of line segments increases.

As described above, both the method using the characteristics of Delaunay triangulation and the method using the characteristics of the Voronoi diagram tend to increase the cost of network data generation depending on the complexity of the original shape (such as the number of vertices and the area of the original shape).

One cause of this is that the cost of processing for simplifying centerlines (for example, processing of thinning out nodes and processing of removing overlapping lines) increases as the amount of generated network data increases because the amount of generated network data depends on the complexity of the original shape due to the characteristics of the algorithm.

Therefore, the centerline simplification device according to the embodiment of the present invention simplifies centerlines based on the features of the centerline generation logic as compared with the methods of the related art, so that surplus centerlines can be removed and their positions can be corrected to appropriate positions.

Specifically, to generate network data for an indoor space, centerlines generated using features of the shape of the indoor space are input and simplified centerlines are output.

Here, the input centerlines are, for example, centerlines generated focusing on the re-entrant vertices of the shape of the space.

Similar to centerlines before simplification, it is also assumed that the simplified centerlines remain in an uninterrupted state in which centerlines do not cross the outer and inner peripheries of the shape of the input indoor space and any internal position of the shape can be connected to centerlines by straight lines.

Centerlines are simplified using removal of centerlines forming closed polygons, which are generated due to the characteristics of the algorithm for centerline generation, removal of unnecessary dead end lines, removal of unnecessary vertices, and correction of detour line segments forming acute angles in combination as simplification methods. This removes unnecessary data for indoor space network data (of nodes and links).

Figure 1:
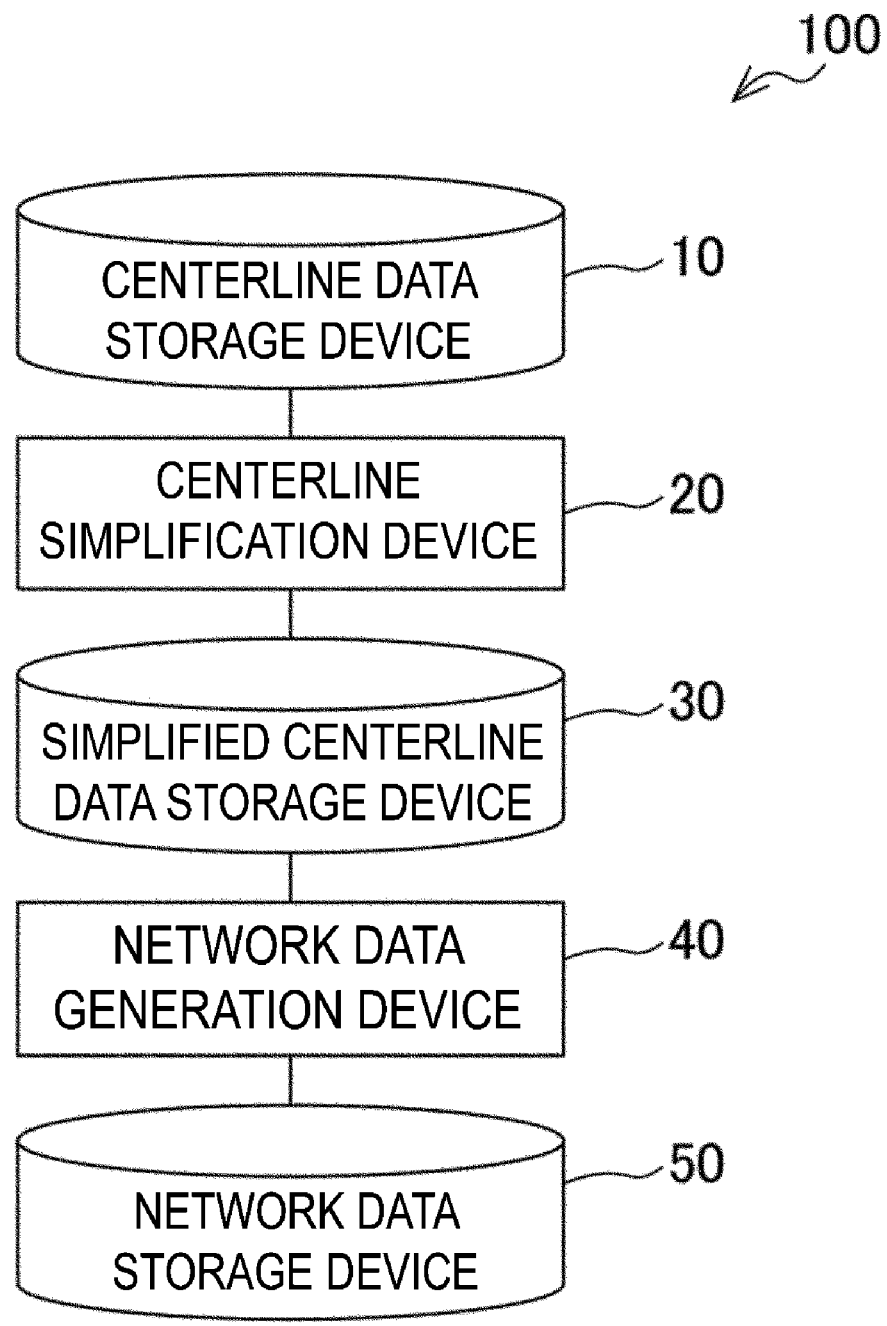
FIG. 1 is a block diagram of a network data generation system according to an embodiment of the present invention.

Configuration of Network Data Generation System according to Embodiment of Present Invention FIG. 1 is a block diagram illustrating a configuration of a network data generation system 100 according to an embodiment of the present invention.

Generally, digital vector data such as architectural 2D computer-aided design (CAD) data created for building design and a 3D model included in building information modeling (BIM) data is used to generate centerlines.

Architectural CAD here is software that creates drawings such as plan views, elevation views, cross-sectional views, and perspective views of the solids of constructions such as buildings and structures. Architectural CAD has a layer definition and generally divides columns, stores, toilets, escalators, and the like in addition to walls and corridors into layers and manages them in layers.

BIM manages digital models including three-dimensional building shapes and attribute information. BIM has a class definition. In industry foundation classes (IFC) which is one format of BIM data, classes are defined for structures such as floors, spaces, stairs, doors, and columns.

When BIM data is used, it is treated as 2D vector data through horizontal projection of each floor. Focusing on features of such shape data (re-entrant vertices of the shape of an indoor space), centerlines of passages in an indoor space are generated and the generated centerlines are used as input data.

In generation of centerlines of passages, points generated from the bisectors of re-entrant vertices are connected in an exhaustive manner. When points are connected, a vertex of each centerline is connected to a farthest center point on the inner/outer periphery (walls in the indoor space) if there is such a farthest center point to which the vertex can be connected without touching the walls and without crossing already generated centerlines.

The network data generation system 100 according to the embodiment of the present invention includes a centerline data storage device 10 that stores the input data, a centerline simplification device 20 that simplifies centerlines represented by the input data, a simplified centerline data storage device 30 that stores the simplified centerlines, a network data generation device 40 that automatically generates network data from the simplified centerlines, and a network data storage device 50 that stores the generated network data.

Configuration of Centerline Simplification Device

Figure 2:
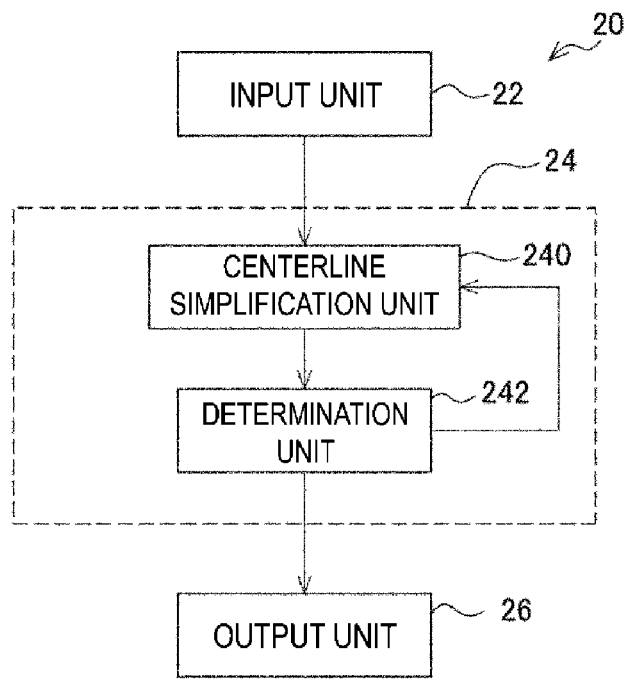
FIG. 2 is a block diagram of a centerline simplification device according to the embodiment of the present invention.

Next, a configuration of the centerline simplification device 20 will be described. As illustrated in FIG. 2, the centerline simplification device 20 can be formed of a computer including a CPU, a RAM, and a ROM that stores programs and various data for executing processing routines that will be described later. The centerline simplification device 20 functionally includes an input unit 22, a computing unit 24, and an output unit 26 as illustrated in FIG. 2.

The input unit 22 receives input data representing centerlines of passages that are movable regions in an indoor space from the centerline data storage device 10.

Here, the centerlines are continuous lines that are generated using re-entrant vertices which are elements included in the two-dimensional vector data and that do not cross the boundaries of the passages in the indoor space and include a plurality of straight lines.

Here, a passage is a space for moving between rooms. A space corresponds to a passage when the number of entrances and exits connected to the space is two or more and when the shape of the space is a concave (sunken) polygon. The boundaries of passages are perimeters which are the outer and inner peripheries of the shapes of the passages.

The computing unit 24 includes a centerline simplification unit 240 and a determination unit 242 as illustrated in FIG. 2.

The centerline simplification unit 240 performs processing of deleting centerlines and processing of correcting centerlines.

The determination unit 242 determines whether or not the centerline simplification unit 240 has ended simplification based on the number of centerlines or the number of vertices connecting the centerlines. Specifically, the centerline simplification unit 240 repeats the simplification until there is no change in the number of centerlines or the number of vertices connecting the centerlines.

Details of Simplification of Centerline Simplification Unit 240

Shapes generated using the centerline generation logic that focuses on the features of indoor space shapes have a feature that "surplus closed polygons are included" and "surplus dead end lines are included" in network data due to the characteristics of the generation logic. Here, the characteristics of the generation logic are those such as "points generated from the bisectors of re-entrant vertices being connected in an exhaustive manner" and "a vertex of each centerline being connected to a farthest center point on the inner/outer periphery (walls in the indoor space) if there is such a farthest center point to which the vertex can be connected without touching the walls (other connection lines) and without crossing already generated centerlines".

It is also necessary to consider the removal of surplus vertices (nodes), similar to the technologies of the related art.

Further, considering that network data is to be finally generated, it is necessary to correct routes having acute angles that are unrelated to the original shape (which are generated due to the logic).

Thus, closed polygons, surplus dead ends, surplus vertices, and detour line segments forming acute angles which are generated due to the characteristics of the generation logic described above are removed so that surplus nodes and links are removed and their positions are corrected to appropriate positions.

However, because centerlines are those of shapes for route searching, the meaning of centerlines will be lost if the present simplification logic causes the centerlines to be interrupted or to cross walls (the inner or outer periphery of shapes) and thus this also needs to be considered.

Centerlines are simplified by repeating a combination of the following four methods (1) to (4) until centerline disconnection occurs or until the number of centerlines or the number of vertices of centerlines does not decrease.

(1) Removal of centerlines forming closed polygons
(2) Removal of surplus dead end lines
(3) Removal of surplus vertices
(4) Correction of detour line segments forming acute angles The above four methods have a feature that they can make centerlines remain in an uninterrupted state in which centerlines do not cross the outer and inner peripheries which are boundaries of the shapes of passages of the input indoor space and any internal position of the shape can be connected to centerlines by straight lines.

The centerline deletion processing includes (1) removal of centerlines forming closed polygons, (2) removal of surplus dead end lines, and (3) removal of surplus vertices. The centerline correction processing includes (4) correction of detour line segments forming acute angles.

In "(1) Removal of centerlines forming closed polygons", centerlines corresponding to the longest sides of closed polygons defined by centerlines are deleted.

Figure 3:
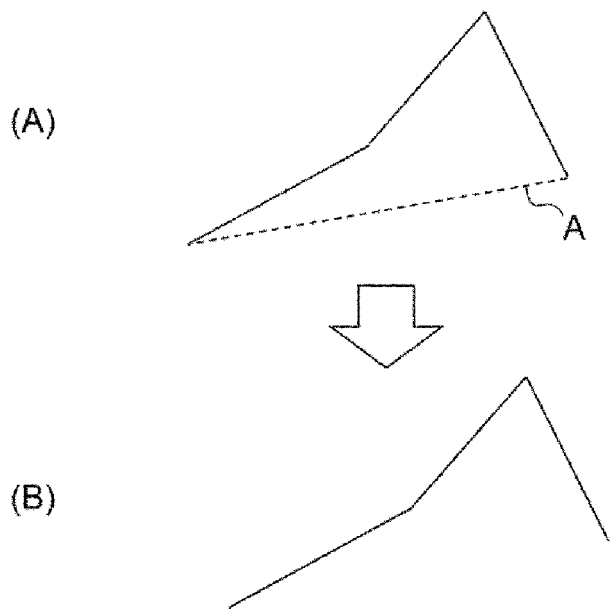
FIG. 3 is a diagram illustrating an example of a result of removal of a centerline forming a closed polygon.

Specifically, when centerlines are created, a line is drawn from each re-entrant vertex in the center of the angle and a center point is created at the center of the line. If the line crosses another line, the point of intersection is created as a center point. Then, to create centerlines which do not touch walls by connecting center points, a closed polygon formed by centerlines is created as illustrated in FIG. 3(A). However, this causes an overlapping network with all centerlines reaching the same point of location. Therefore, a centerline A which is the longest side of a closed polygon is removed to simplify the centerlines as illustrated in FIG. 3(B).

Figure 4:
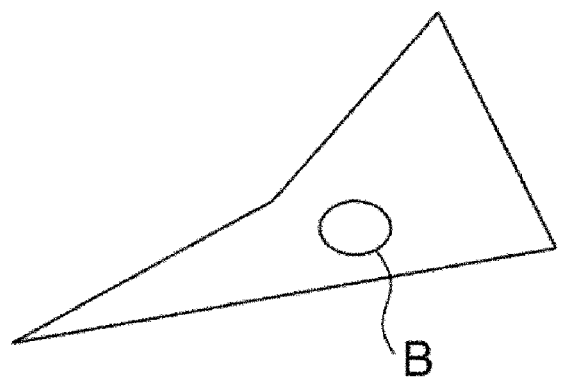
FIG. 4 is a diagram illustrating an example in which a centerline forming a closed polygon is not removed.

Here, if a hollow polygon B (such as a column of a building) is present in a closed polygon as illustrated in FIG. 4, a centerline which is the longest side of the closed polygon is not removed because the removal will eliminate a bypass route. However, when the size of the hollow polygon is small, the polygon may be removed as long as bypass route elimination causes no problems.

In "(2) Removal of surplus dead end lines", a centerline including a dead end point which is one end of the centerline is deleted when straight lines which connect the dead end point and ends, opposite the centerline, of other centerlines connected to the centerline do not cross the boundary of the passage in the indoor space.

Figure 5:
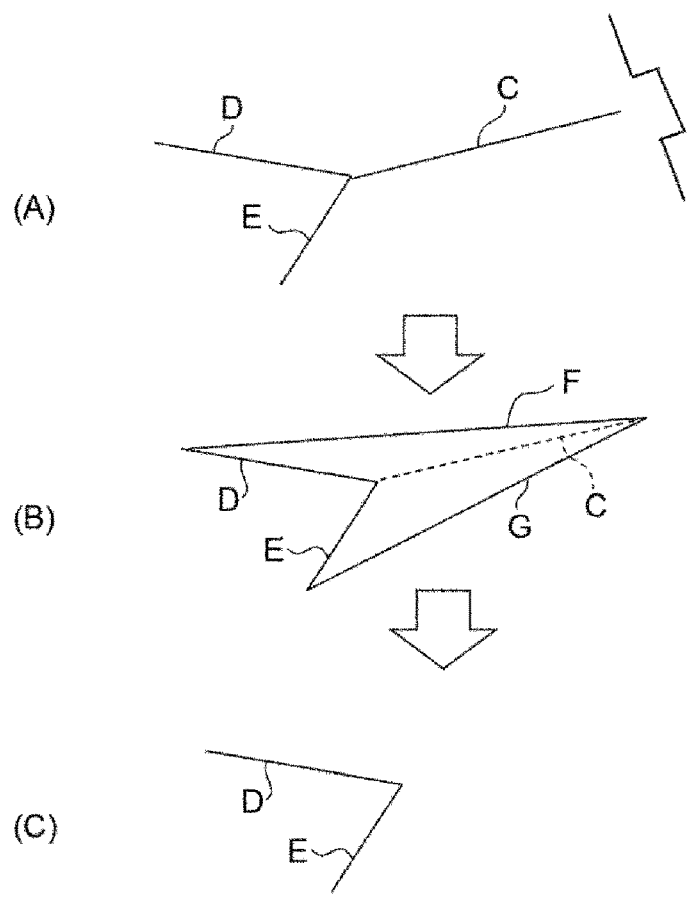
FIG. 5 is a diagram illustrating an example of a result of removal of a line forming a dead end of a centerline.

For example, if there are re-entrant angles in the shape of the passage in the indoor space, an unnecessary dead end line C will be generated toward the vicinity of the re-entrant angles as illustrated in FIG. 5(A). Therefore, the dead end line C is removed if lines F and G which connect the dead end point and ends, opposite the dead end line C, of centerlines D and E connected to the dead end line C do not cross the boundary of the original shape as illustrated in FIGS. 5(B) and 5(C).

Figure 6:
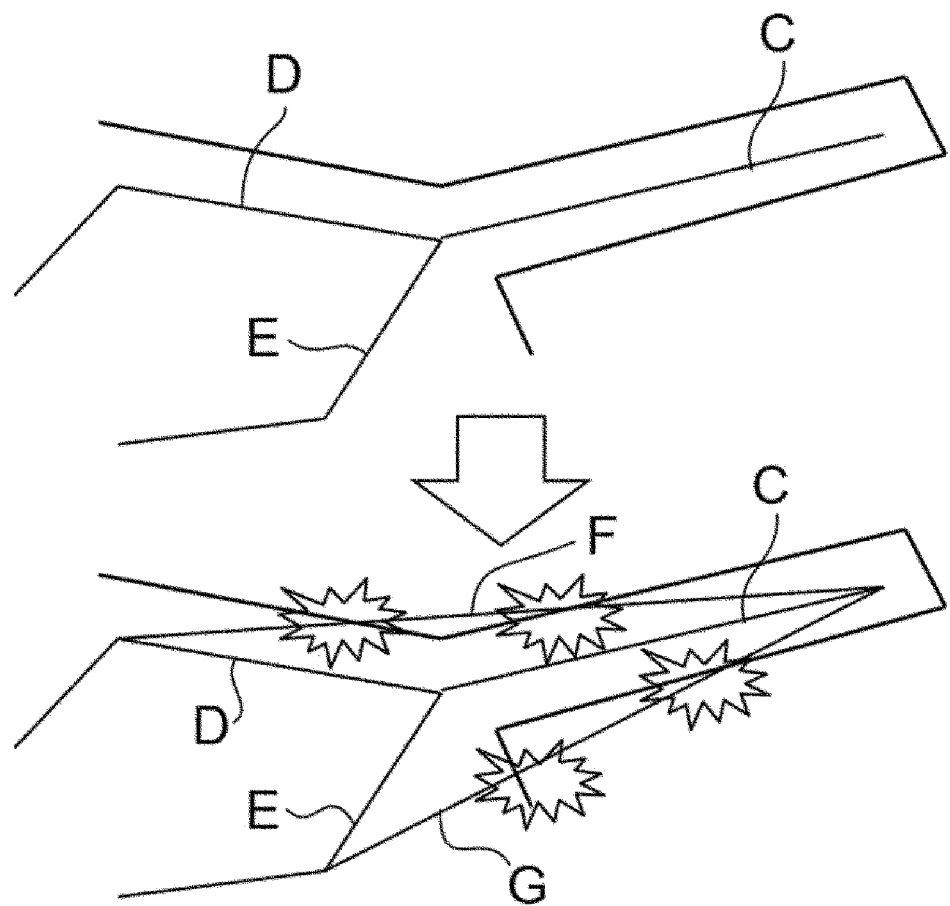
FIG. 6 is a diagram illustrating an example in which a line forming a dead end of a centerline is not removed.

However, if lines F and G which connect the dead end point and ends, opposite the dead end line C, of centerlines D and E connected to the dead end line C cross the boundary of the original shape as illustrated in FIG. 6, the dead end line C is not removed because it is an effective centerline heading toward the narrow passage.

In "(3) Removal of surplus vertices", a vertex connected to two centerlines is searched for among vertices of centerlines. Then, vertices of the two centerlines opposite the found vertex are connected by a straight line and the two centerlines are deleted and the straight line is newly added if the straight line does not cross the boundary of the passage in the indoor space.

Figure 7:
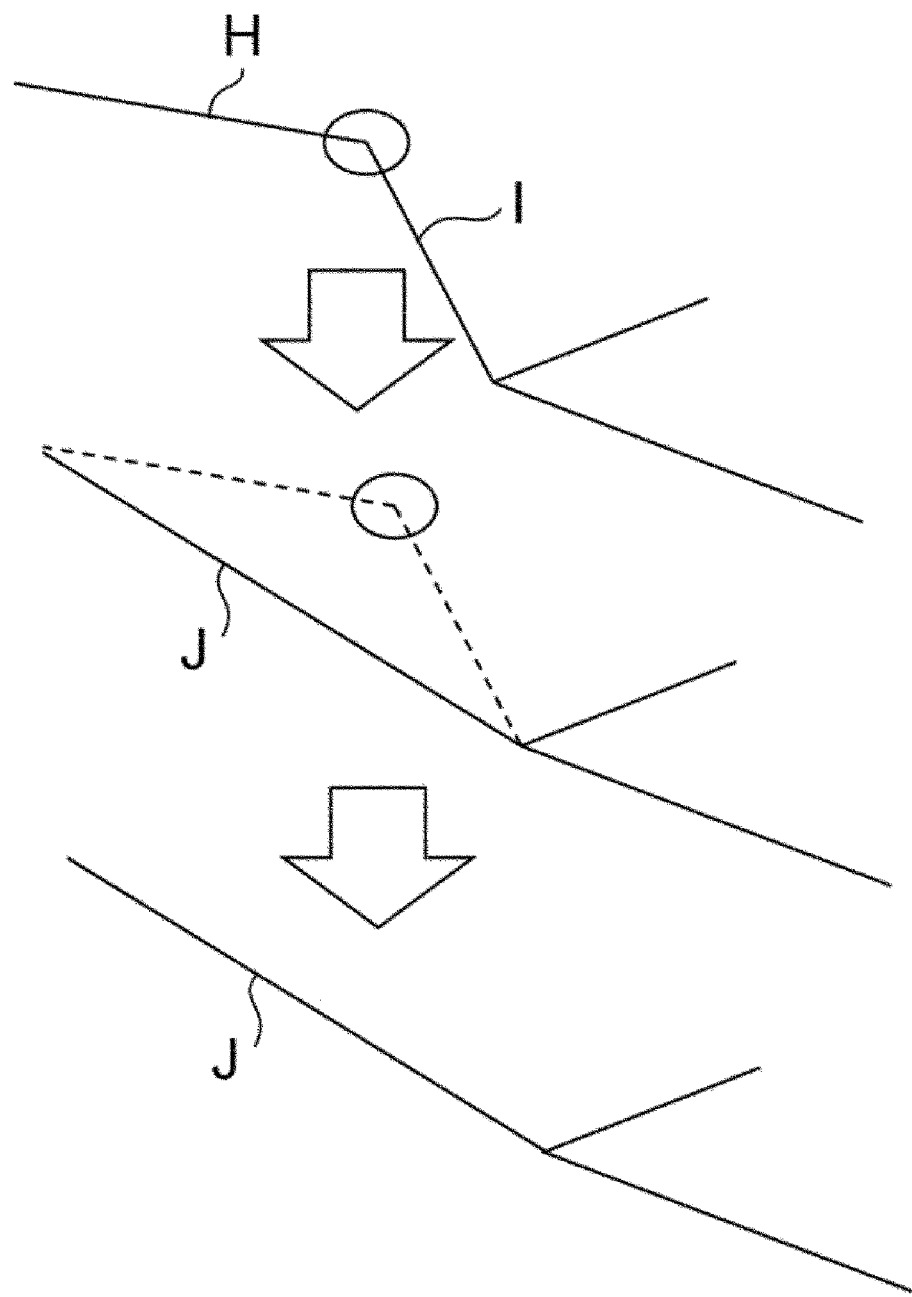
FIG. 7 is a diagram illustrating an example of a result of removal of a surplus vertex.

Specifically, as illustrated in FIG. 7, a vertex connected to two centerlines H and I is searched for and vertices of the two centerlines H and I opposite the found vertex are connected by a straight line J and then the two centerlines H and I are removed and the new straight line J is added if the new straight line J does not cross the boundary of the original shape.

Figure 8:
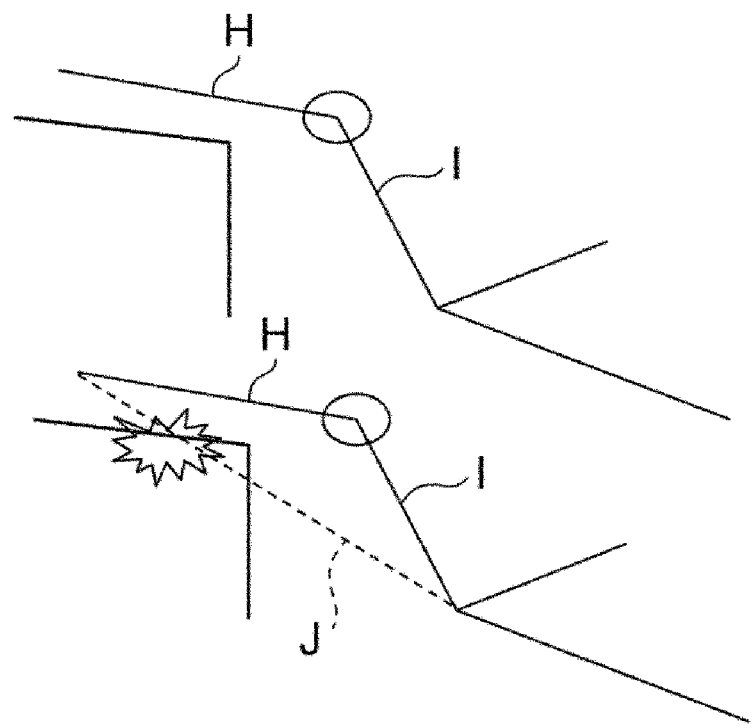
FIG. 8 is a diagram illustrating an example in which a surplus vertex is not removed.

However, if the new straight line J crosses the boundary of the original shape as illustrated in FIG. 8, the two centerlines H and I are not removed because the new straight line J touches a wall.

Figure 9:
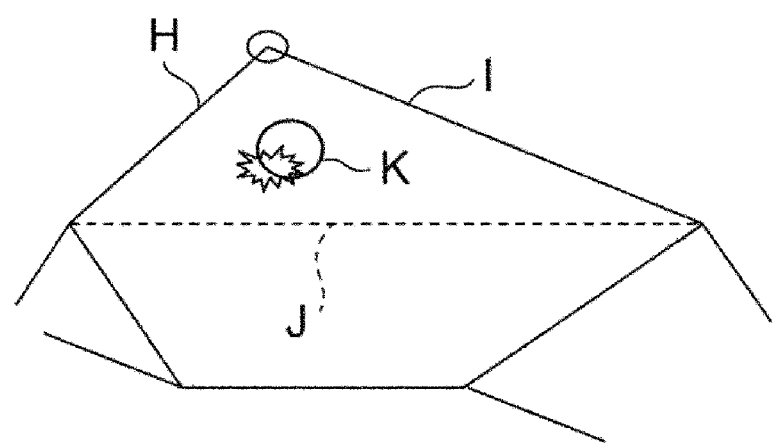
FIG. 9 is a diagram illustrating an example in which a surplus vertex is not removed.

In the case as illustrated in FIG. 9, two centerlines H and I are to be removed because a new straight line J does not cross the boundary of the original shape. However, removal of the two centerlines H and I eliminates one route that bypasses a hollow polygon K (column). Therefore, the two centerlines H and I are not removed if the hollow polygon K is included in a triangle formed by the two centerlines H and I to be deleted and the new straight line J to be generated. However, when the size of the hollow polygon K is small, it may be removed as long as bypass route elimination causes no problems.

In "(4) Correction of detour line segments forming acute angles", a vertex connected to two centerlines that form an acute angle is searched for among vertices of centerlines. Then, vertices of the two centerlines opposite the found vertex are connected by a straight line and the longer of the two centerlines is deleted and the straight line is newly added if the straight line does not cross the boundary of the passage in the indoor space and is shorter than at least one of the two centerlines.

Figure 10:
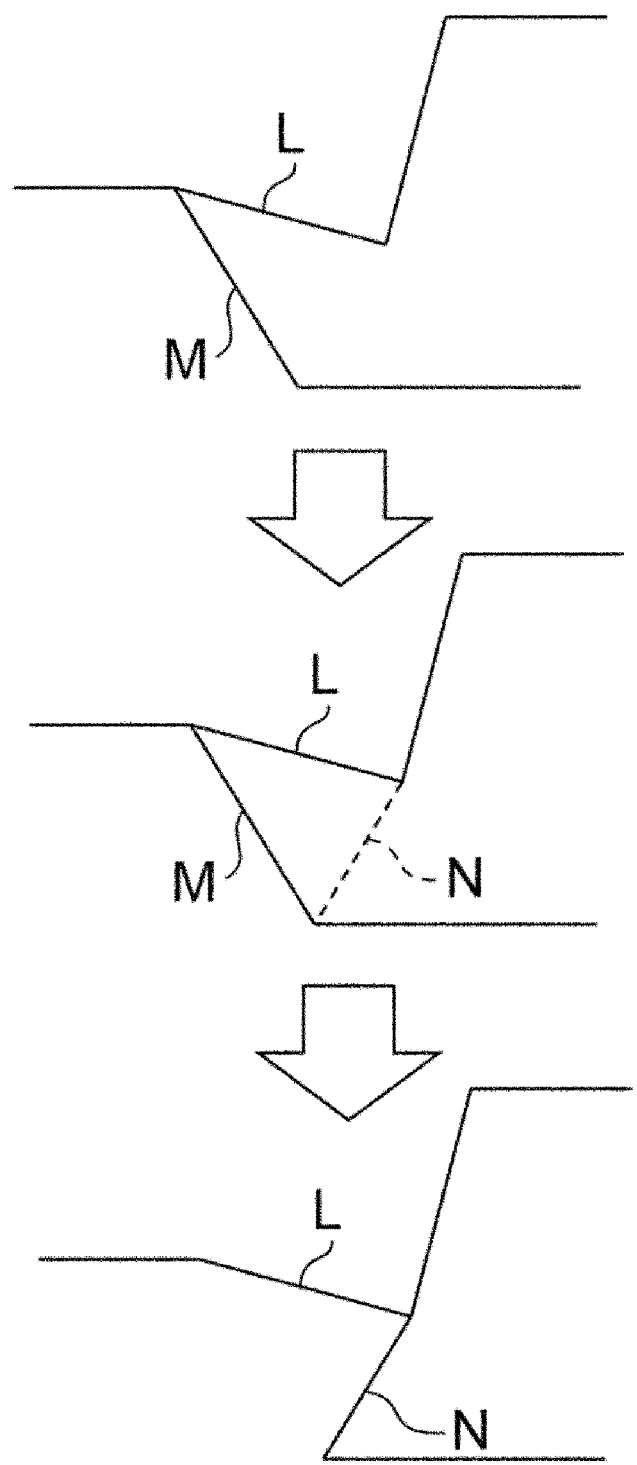
FIG. 10 is a diagram illustrating an example of a result of correction of detour line segments forming an acute angle.

Specifically, as illustrated in FIG. 10, vertices of two centerlines L and M forming an acute angle, which are opposite a vertex connected to the two centerlines L and M, are connected by a new line segment N and the longer line segment M is removed and the new line segment N is added if the new line segment N is shorter than at least one of the two line segments L and M.

Figure 11:
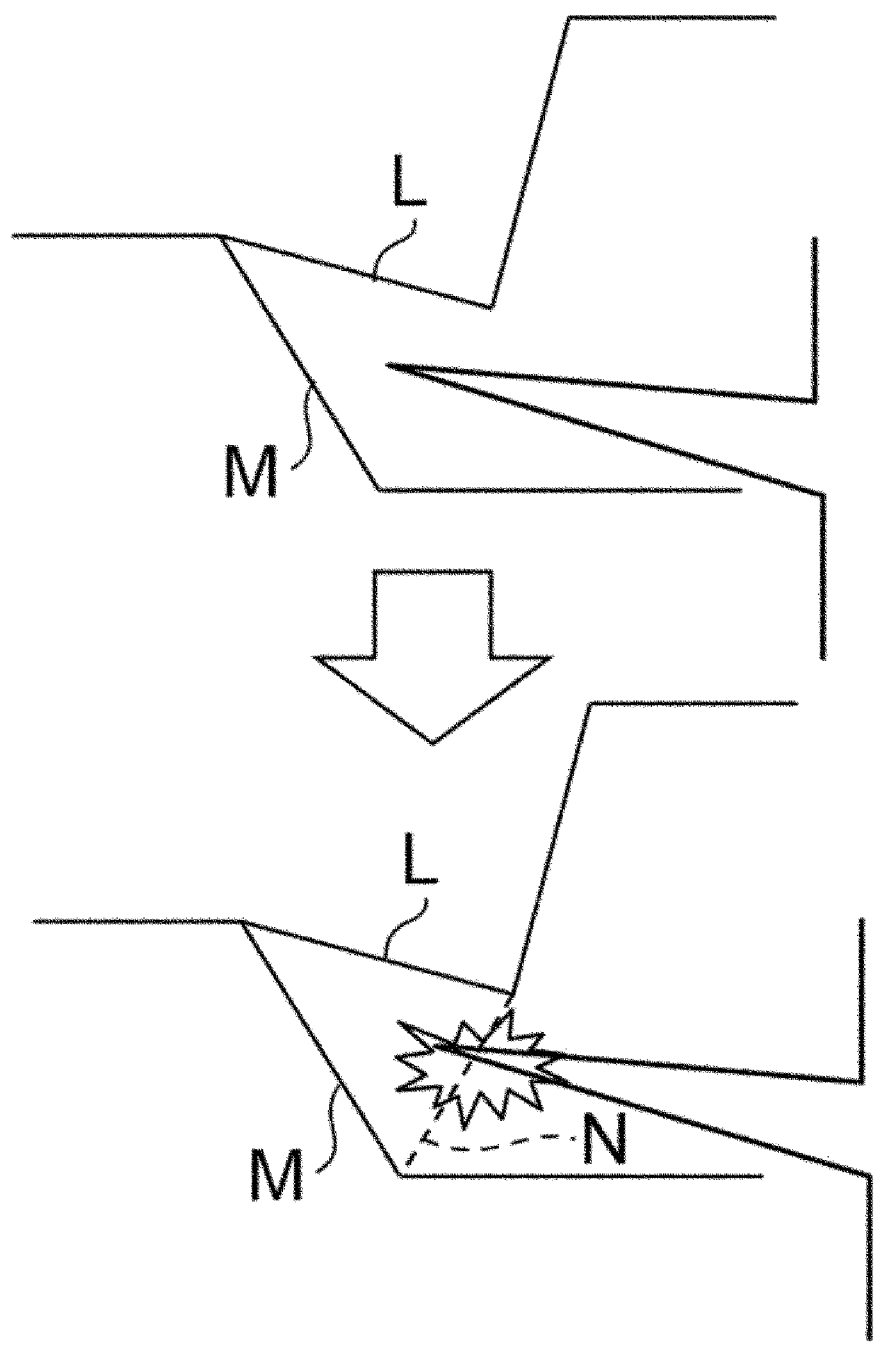
FIG. 11 is a diagram illustrating an example in which detour line segments forming an acute angle are not corrected.

However, if the new line segment N crosses the boundary of the original shape as illustrated in FIG. 11, the longer line segment M is not removed because the new line segment N touches a wall.

Figure 12:
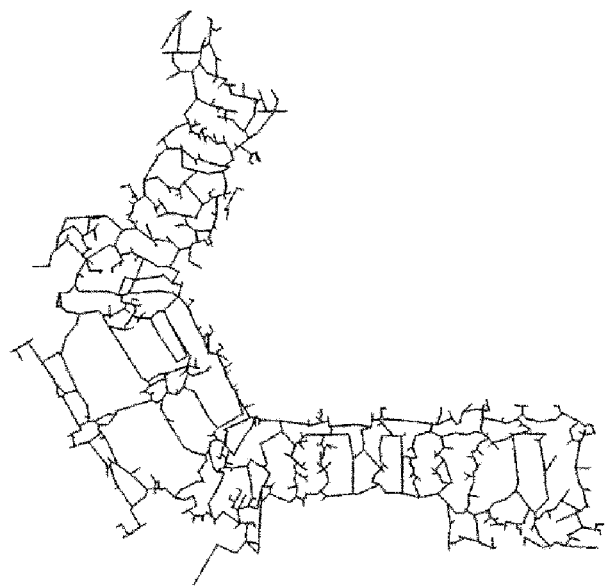
FIG. 12 is a diagram illustrating an example of centerlines before being simplified by the centerline simplification device according to the embodiment of the present invention.
Figure 13:
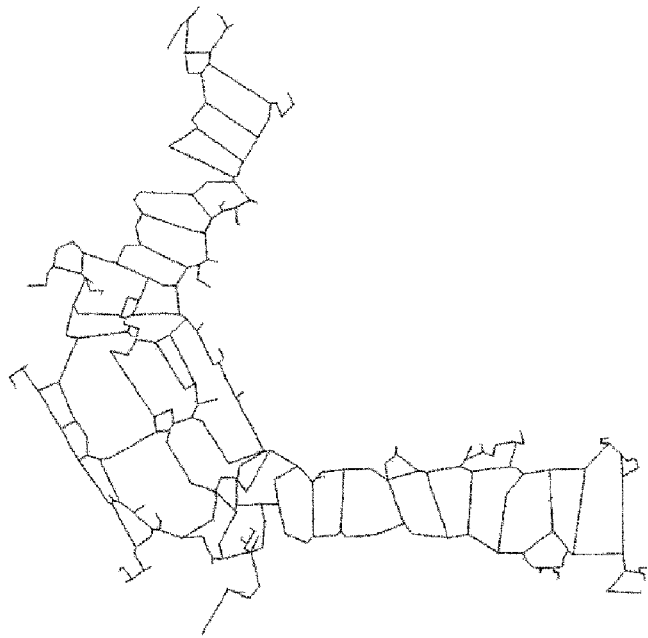
FIG. 13 is a diagram illustrating an example of centerlines after being simplified by the centerline simplification device according to the embodiment of the present invention.

By combining and repeating the above four methods (1) to (4) up to immediately before centerline disconnection occurs or until the number of vertices of centerlines does not decrease, centerlines as illustrated in FIG. 12 can be simplified into centerlines as illustrated in FIG. 13. This allows centerlines to be removed until the number of vertices of centerlines which is initially about 2000 is reduced to about 400 (one fifth or less).

Configuration of Network Data Generation Device 40

The network data generation device 40 according to the embodiment of the present invention sorts target spaces which are parts of an indoor space from input data into rooms, passages, entrances and exits, and floor connections for each floor. Along with this, the network data generation device 40 according to the embodiment of the present invention generates nodes at vertices and points of intersection of centerlines and connects the nodes by links based on the simplified centerlines to automatically generate network data for the indoor space. Here, the network data includes links representing passages and nodes that are starting or end points of the links.

Specifically, if target spaces can be sorted by the class and layer definitions of input data or by names and attribute information given to their shapes, they are sorted into rooms, passages, entrances and exits, and floor connections for each floor.

Here, rooms are spaces that can be destinations which are navigation points. A space corresponds to a room when the number of entrances and exits connected to the space is one. A space also corresponds to a room when the shape of the space is a convex polygon.

Spaces are regions that are meaningful units (such as passages or rooms) into which an indoor space is divided. Spaces are movable regions for which network data is to be generated.

Entrances and exits are locations (such as doors or parts without walls) where spaces are connected and floor connections are locations (such as stairs, elevators, or escalators) where floors of an indoor space are connected.

Links are lines which are drawn in movable regions assuming that moving bodies (such as people, wheelchairs, strollers, robots, or drones) can move along the links. Both ends of a link are always nodes. In addition to basic attribute information such as the direction and length, each link can have features of the movable region such as the height, the width, steps, the number of steps, and handrails as attribute information. When there is a branch midway on a link or when the direction of a link is to be changed, a node is set at its starting point to divide the link.

Nodes are points that are starting or end points of links. In addition to generation of a node, for example, when changing the direction of a link (creating a curve) or when branching from a link, a node may be intentionally set midway on a link to divide the link, for example, when a navigation point is desired to be set near an entrance/exit.

In addition, by adding attribute information included in the input data to network data when generating the network data, it is possible to efficiently and automatically generate data with a higher utility value.

Here, the attribute information of the input data includes information which is directly included in "rooms", "passages", "entrances and exits", or "floor connections" as attribute information and information which is not directly included but is obtained by automatically extracting shapes included near or inside such shapes (for example, handrails for stairs and the number of toilet bowls in toilets) or attribute information of the shapes (for example, the materials of floors in the spaces).

When attribute information is added such that the same attribute information is added to a plurality of pieces of network data, it is also possible to reduce the amount of data by separately generating a POI and adding an ID thereof to the attribute information. Here, POI is an abbreviation for point of interest and is used to manage representative points for the shapes of spaces (such as stores, rooms, or toilets) and their attributes.

Operation of Centerline Simplification Device According to Embodiment of Present Invention Next, the operation of the centerline simplification device 20 according to the embodiment of the present invention will be described.

Figure 14:
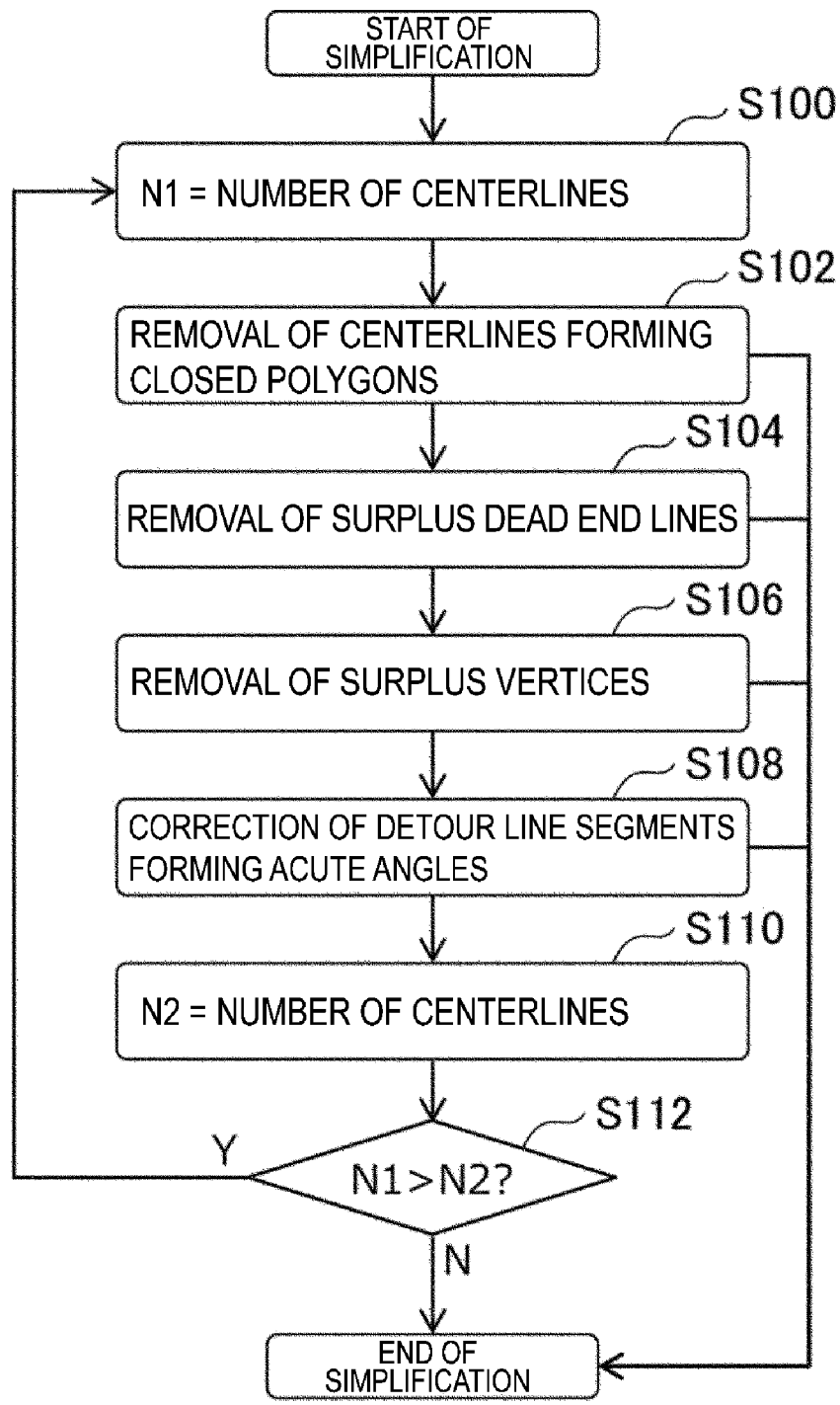
FIG. 14 is a flowchart showing a centerline simplification processing routine for the centerline simplification device according to the embodiment of the present invention.

First, input data representing centerlines of passages, which are movable region in an indoor space, is stored in advance in a centerline data storage device 10. Then, upon receiving the input data stored in the centerline data storage device 10 through the input unit 22, the centerline simplification device 20 executes a centerline simplification processing routine illustrated in FIG. 14.

In step S100, the number of centerlines at the current time is substituted into N1 for the input data. Then, in step S102, removal of centerlines forming closed polygons is performed for the input data. If the removal results in centerline disconnection, the centerlines are restored to those before the removal and the centerline simplification processing routine ends.

In step S104, removal of surplus dead end lines is performed for the input data. Here, if the removal results in centerline disconnection, the centerlines are restored to those before the removal and the restored centerlines are stored in the simplified centerline data storage device 30 through the output unit 26 and then the centerline simplification processing routine ends.

In step S106, removal of surplus vertices is performed for the input data. Here, if the removal results in centerline disconnection, the centerlines are restored to those before the removal and the restored centerlines are stored in the simplified centerline data storage device 30 through the output unit 26 and then the centerline simplification processing routine ends.

In step S108, correction of detour line segments forming acute angles is performed for the input data. If the correction results in centerline disconnection, the centerlines are restored to those before the correction and the restored centerlines are stored in the simplified centerline data storage device 30 through the output unit 26 and then the centerline simplification processing routine ends.

Then, in step S110, the number of centerlines at the current time is substituted into N2 for the input data after the processes of steps S102 to S108.

In step S112, it is determined whether or not N1>N2. If N1>N2, the process returns to step S100. On the other hand, if N1=N2, it is determined that the simplification processing has ended and the centerlines are stored in the simplified centerline data storage device 30 through the output unit 26 and then the centerline simplification processing routine ends.

Although the above centerline simplification processing routine has been described with reference to an example where it is determined whether or not simplification has ended based on the number of centerlines, the present invention is not limited to this example and it may be determined whether or not simplification has ended based on the number of vertices connecting centerlines.

As described above, the centerline simplification device according to the embodiment of the present invention repeats a combination of the following processes until the number of centerlines does not decrease, whereby it is possible to simplify centerlines for generating network data of an indoor space while limiting the amount of calculation. The "following processes" are removal of centerlines forming closed polygons, removal of surplus dead end lines, removal of surplus vertices, and correction of detour line segments forming acute angles.

Further, the network data generation system according to the embodiment of the present invention limits the amount of calculation in centerline simplification, whereby it is possible to generate network data of an indoor space while limiting the amount of calculation.

The present invention is not limited to the above embodiment and various modifications and applications are possible without departing from the scope of the present invention.

Although the centerline simplification device 20 described above has a computer system inside, it is assumed that the "computer system" also includes a website providing environment (or display environment) when a WWW system is used.

Further, although the embodiment has been described in which a program is installed in advance in the present specification, the program can also be stored and provided in a computer-readable recording medium or can be provided via a network.

REFERENCE SIGNS LIST

10 Centerline data storage device
20 Centerline simplification device
22 Input unit
24 Computing unit
26 Output unit
30 Simplified centerline data storage device
40 Network data generation device
50 Network data storage device
100 Network data generation system
240 Centerline simplification unit
242 Determination unit

The invention claimed is:

1. A centerline simplification device for simplifying centerlines of passages that are movable regions in an indoor space, the centerline simplification device comprising a processor configured to execute a method comprising:
   receiving a set of centerlines of passages inside the indoor space; and
   iteratively processing:
      deleting a centerline from the set of centerlines based at least on a relative location of the centerline to another centerline of the set of centerlines;
      correcting remaining centerlines of the set of centerlines, wherein the correcting comprises:
         identifying a first vertex connected to two centerlines forming an acute angle among vertices of the remaining centerlines of the set of centerlines;
         connecting vertices, opposite the identified first vertex, of the two centerlines by a straight line; and
         deleting a longer of the two centerlines and newly adding the straight line when the straight line does not cross a first boundary of a passage in the indoor space and is shorter than at least one of the two centerlines; and
      determining whether to stop the iteratively processing based on either a number of the remaining centerlines or a number of vertices connecting the remaining centerlines.

2. The centerline simplification device according to claim 1, wherein the iteratively processing includes deleting the centerline corresponding to the longest side of a closed polygon defined by at least three centerlines of the set of centerlines.

3. The centerline simplification device according to claim 2, wherein the iteratively processing includes deleting the centerline including a dead end point which is an end of the centerline when a straight line connecting the dead end point and an end, opposite the centerline including the dead end point, of another centerline connected to the centerline including the dead end point does not cross a second boundary of a passage in the indoor space.

4. The centerline simplification device according to claim 1, wherein the iteratively processing includes deleting the centerline including a dead end point which is an end of the centerline when a straight line connecting the dead end point and an end, opposite the centerline including the dead end point, of another centerline connected to the centerline including the dead end point does not cross a second boundary of a passage in the indoor space.

5. The centerline simplification device according to claim 1, wherein the iteratively processing includes:
   identifying a second vertex connected to two centerlines among vertices of the remaining centerlines,
   connecting vertices, opposite the identified second vertex, of the two centerlines by a straight line, and
   deleting the two centerlines and newly adding the straight line when the straight line does not cross a second boundary of a passage in the indoor space.

6. The centerline simplification device according to claim 1, wherein the centerline is a continuous line which is generated using re-entrant vertices that are elements included in two-dimensional vector data and which do not cross a second boundary of a passage in the indoor space and include a plurality of straight lines.

7. A network data generation system configured to execute a method comprising:
   receiving a set of centerlines of passages inside an indoor space;
   iteratively processing:
      deleting a centerline from the set of centerlines based at least on a relative location of the centerline to another centerline of the set of centerlines;
      correcting remaining centerlines of the set of centerlines, wherein the correcting process comprises:
         identifying a first vertex connected to two centerlines forming an acute angle among vertices of remaining centerlines of the set of centerlines;
         connecting vertices, opposite the identified first vertex, of the two centerlines by a straight line; and
         deleting a longer of the two centerlines and newly adds the straight line when the straight line does not cross a first boundary of a passage in the indoor space and is shorter than at least one of the two centerlines; and
      determining whether to stop the iteratively processing based on either a number of the remaining centerlines or a number of vertices connecting the remaining centerlines; and
   generating network data including links representing passages and nodes that are starting or end points of the links based on the remaining centerlines of the set of centerlines.

8. The system according to claim 7, wherein the iteratively processing includes deleting the centerline corresponding to the longest side of a closed polygon defined by the remaining centerlines.

9. The system according to claim 8, wherein the iteratively processing includes deleting the centerline including a dead end point which is an end of the centerline a straight line connecting the dead end point and an end, opposite the centerline including the dead end point, of another centerline connected to the centerline including the dead end point does not cross a second boundary of a passage in the indoor space.

10. The system according to claim 7, wherein the iteratively processing includes deleting the centerline including a dead end point which is an end of the centerline when a straight line connecting the dead end point and an end, opposite the centerline including the dead end point, of another centerline connected to the centerline including the dead end point does not cross a second boundary of a passage in the indoor space.

11. The system according to claim 7, wherein the iteratively processing includes:
   identifying a second vertex connected to two centerlines among vertices of the remaining centerlines,
   connecting vertices, opposite the identified second vertex, of the two centerlines by a straight line, and
   deleting the two centerlines and newly adds the straight line if the straight line does not cross a second boundary of a passage in the indoor space.

12. The system according to claim 7, wherein the centerline is a continuous line which is generated using re-entrant vertices that are elements included in two-dimensional vector data and which do not cross a second boundary of a passage in the indoor space and include a plurality of straight lines.

13. A non-transitory computer-readable storage medium that stores a program for causing a computer to execute a method comprising:
   receiving a set of centerlines of passages inside an indoor space; and
   iteratively processing:
      deleting a centerline from the set of centerlines based at least on a relative location of the centerline to another centerline of the set of centerlines;
      correcting remaining centerlines of the set of centerlines, wherein the correcting process comprises:
         identifying a first vertex connected to two centerlines forming an acute angle among vertices of remaining centerlines of the set of centerlines;
         connecting vertices, opposite the identified first vertex, of the two centerlines by a straight line;
         deleting a longer of the two centerlines and newly adds the straight line if the straight line does not cross a first boundary of a passage in the indoor space and is shorter than at least one of the two centerlines; and
      determining whether to stop the iteratively processing based on either a number of the remaining centerlines or a number of vertices connecting the remaining centerlines.

14. The non-transitory computer-readable storage medium according to claim 13, wherein the iteratively processing includes deleting the centerline corresponding to the longest side of a closed polygon defined by the remaining centerlines.

15. The non-transitory computer-readable storage medium according to claim 13, wherein the iteratively processing includes deleting the centerline including a dead end point which is an end of the centerline a straight line connecting the dead end point and an end, opposite the centerline including the dead end point, of another centerline connected to the centerline including the dead end point does not cross a second boundary of a passage in the indoor space.

16. The non-transitory computer-readable storage medium according to claim 13, wherein the iteratively processing includes:
- identifying a second vertex connected to two centerlines among vertices of the remaining centerlines,
- connecting vertices, opposite the identified second vertex, of the two centerlines by a straight line, and
- deleting the two centerlines and newly adds the straight line if the straight line does not cross a second boundary of a passage in the indoor space.

17. The non-transitory computer-readable storage medium according to claim 13, wherein the centerline is a continuous line which is generated using re-entrant vertices that are elements included in two-dimensional vector data and which do not cross a second boundary of a passage in the indoor space and include a plurality of straight lines.

\* \* \* \* \*